US008265623B2

(12) United States Patent
Asanuma et al.

(10) Patent No.: US 8,265,623 B2
(45) Date of Patent: Sep. 11, 2012

(54) RADIO COMMUNICATIONS SYSTEM, AND BASE STATION APPARATUS AND MOBILE RADIO TERMINAL APPARATUS EMPLOYED IN THE SYSTEM

(75) Inventors: Yutaka Asanuma, Tokyo (JP); Kengo Kurose, Hamura (JP); Shigeo Terabe, Kawasaki (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 0 days.

(21) Appl. No.: 11/515,287

(22) Filed: Sep. 1, 2006

(65) Prior Publication Data

US 2007/0167160 A1    Jul. 19, 2007

(30) Foreign Application Priority Data

Jan. 16, 2006    (JP) ................... 2006-007833

(51) Int. Cl.
*H04W 4/00*    (2009.01)
(52) U.S. Cl. .................. 455/434; 455/435.1; 455/435.2; 455/450; 455/455; 455/509; 370/322; 370/341; 370/338; 370/342; 370/329
(58) Field of Classification Search .................. 455/434, 455/450, 419, 452.1, 452.2, 456.2, 466, 522, 455/556.1, 562.1, 23–34, 42, 44, 61, 101–102, 455/105, 107–110, 126, 205, 418, 509, 516, 455/17, 19; 370/329, 208, 210, 331, 342, 370/335, 349, 442, 341, 344
See application file for complete search history.

(56) References Cited

U.S. PATENT DOCUMENTS

| | | | |
|---|---|---|---|
| 6,400,699 B1 * | 6/2002 | Airy et al. ..................... 370/329 |
| 7,154,846 B2 * | 12/2006 | Chen et al. .................... 370/209 |
| 2005/0107036 A1 * | 5/2005 | Song et al. ...................... 455/23 |
| 2006/0009230 A1 * | 1/2006 | Fukumoto et al. .......... 455/452.1 |

OTHER PUBLICATIONS

TSG-RAN WG1 Meeting #21, Turin, Italy, Aug. 27-31, 2001, "DL signalling for HSDPA".
3GPP, "Alternatives for HS-DSCH-related downlink signaling" Jun. 26-28, 2001.
TSG-RAN WG1 and WG2 meeting on HSPDA, "Signalling Channel Structures for TDD HSDPA", Nov. 5, 2001.
3GPP TSG RAN WG1 Meeting #40bis, "Downlink Multiple Access Scheme for Evolved UTRA", Apr. 4-8, 2005.
Extended Search Report dated May 10, 2012 as received in application No. 06 02 4711.1.

* cited by examiner

*Primary Examiner* — Jean Gelin
*Assistant Examiner* — Babar Sarwar
(74) *Attorney, Agent, or Firm* — Maschoff Gilmore & Israelsen

(57) ABSTRACT

The present invention relates to a system conducting multi-carrier communications between a base station and a plurality of mobile terminals. When a transmission format of an individual information channel transmitted from the base station to the mobile terminals is output over a control channel from the base station to the mobile terminals, the transmission is conducted over the control channel of the same chunk as the chunk used in the individual information channel.

6 Claims, 12 Drawing Sheets

| MCS Number | MCS modulation, Coding rate |
|---|---|
| 1 | QPSK, R = 1/3 |
| 2 | QPSK, R = 1/2 |
| 3 | 16QAM, R = 1/3 |
| 4 | 16QAM, R = 1/2 |
| 5 | 64QAM, R = 1/2 |
| 6 | 64QAM, R = 2/3 |
| ⋮ | ⋮ |

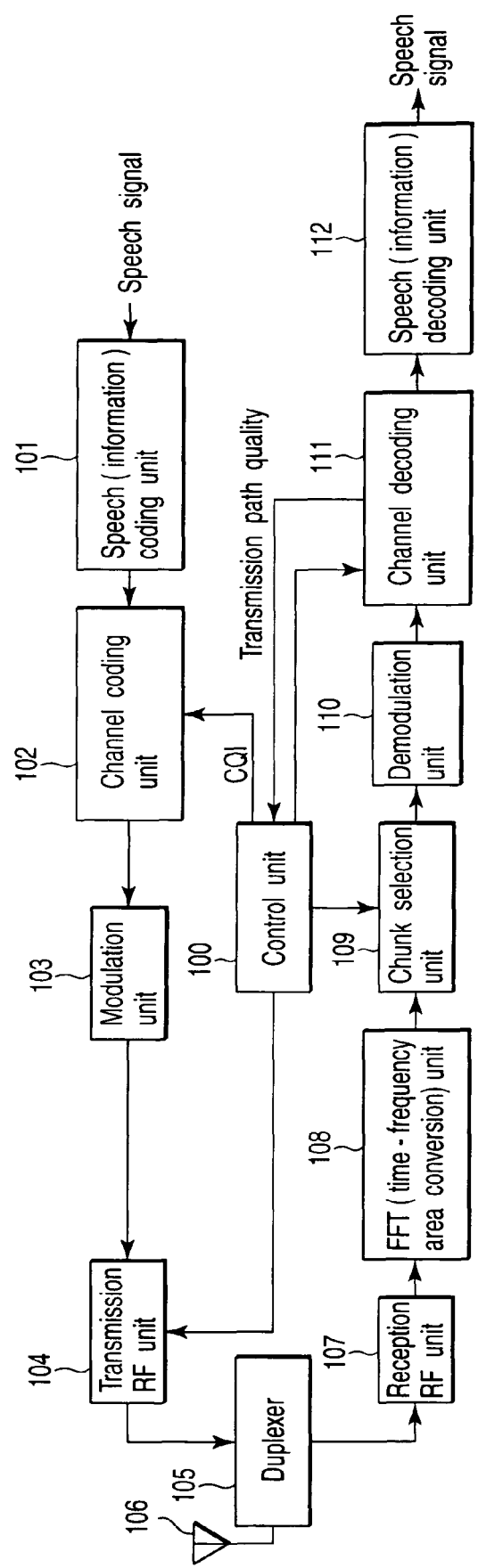
F I G. 7

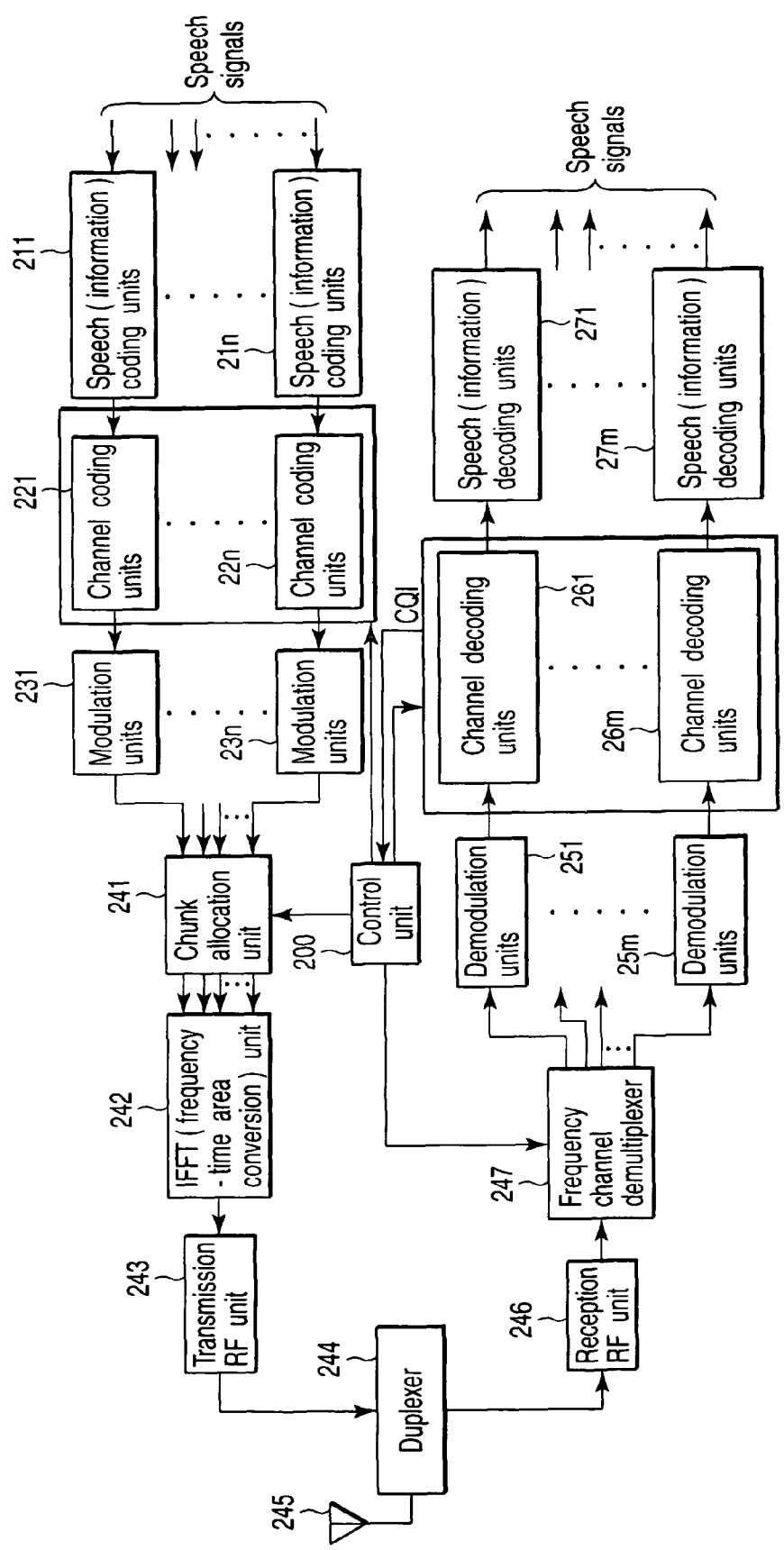
F I G. 8

| MCS Number of CQI | Individual information channel | Control channel |
|---|---|---|
| | MCS Modulation, Coding rate | MCS Modulation, Coding rate |
| 1 | QPSK, R = 1/3 | BPSK, R = 1/3 |
| 2 | QPSK, R = 1/2 | |
| 3 | 16QAM, R = 1/3 | QPSK, R = 1/3 |
| 4 | 16QAM, R = 1/2 | |
| 5 | 64QAM, R = 1/2 | QPSK, R = 1/2 |
| 6 | 64QAM, R = 2/3 | |
| ⋮ | ⋮ | ⋮ |

FIG.11

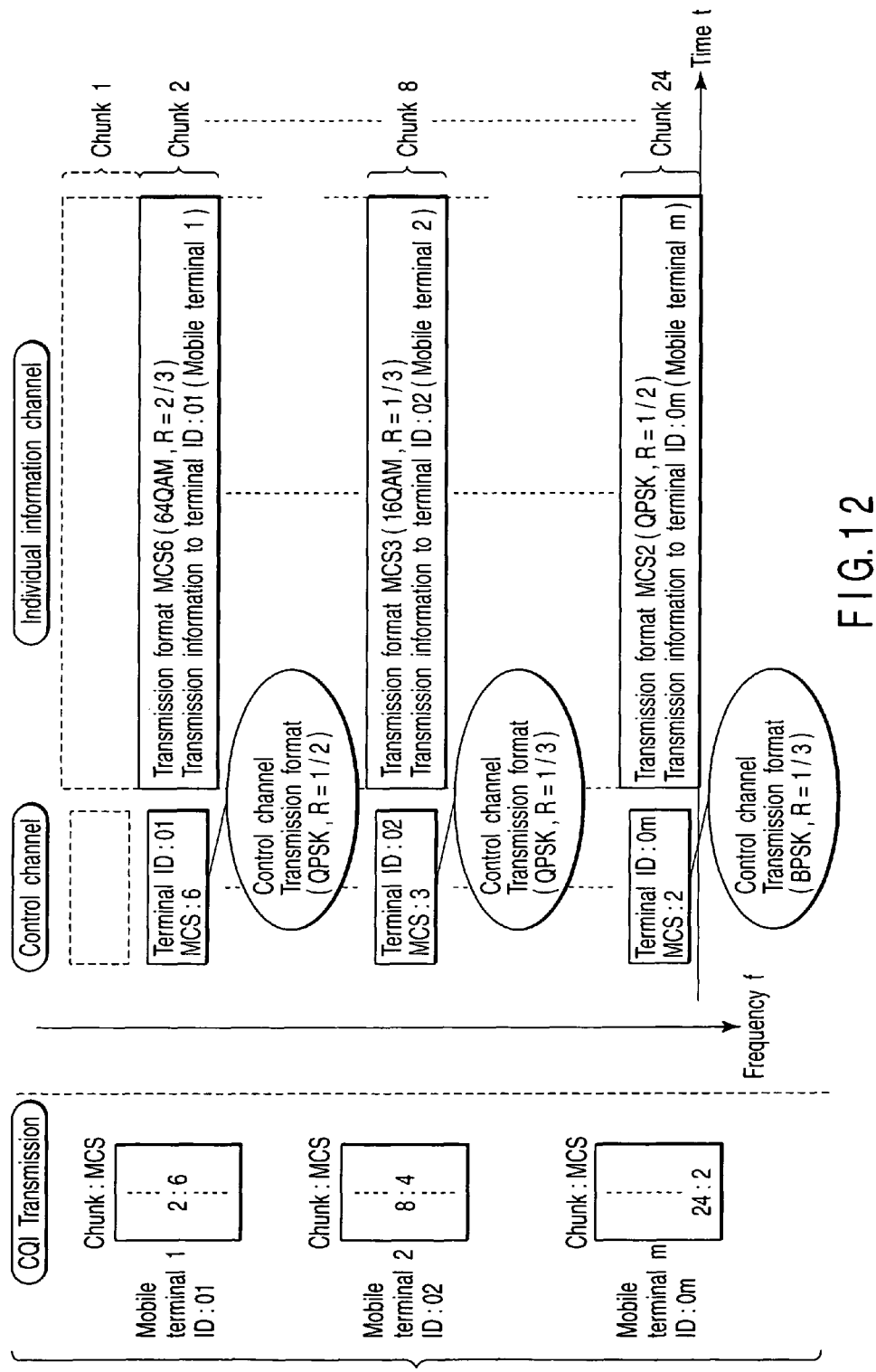
F I G. 12

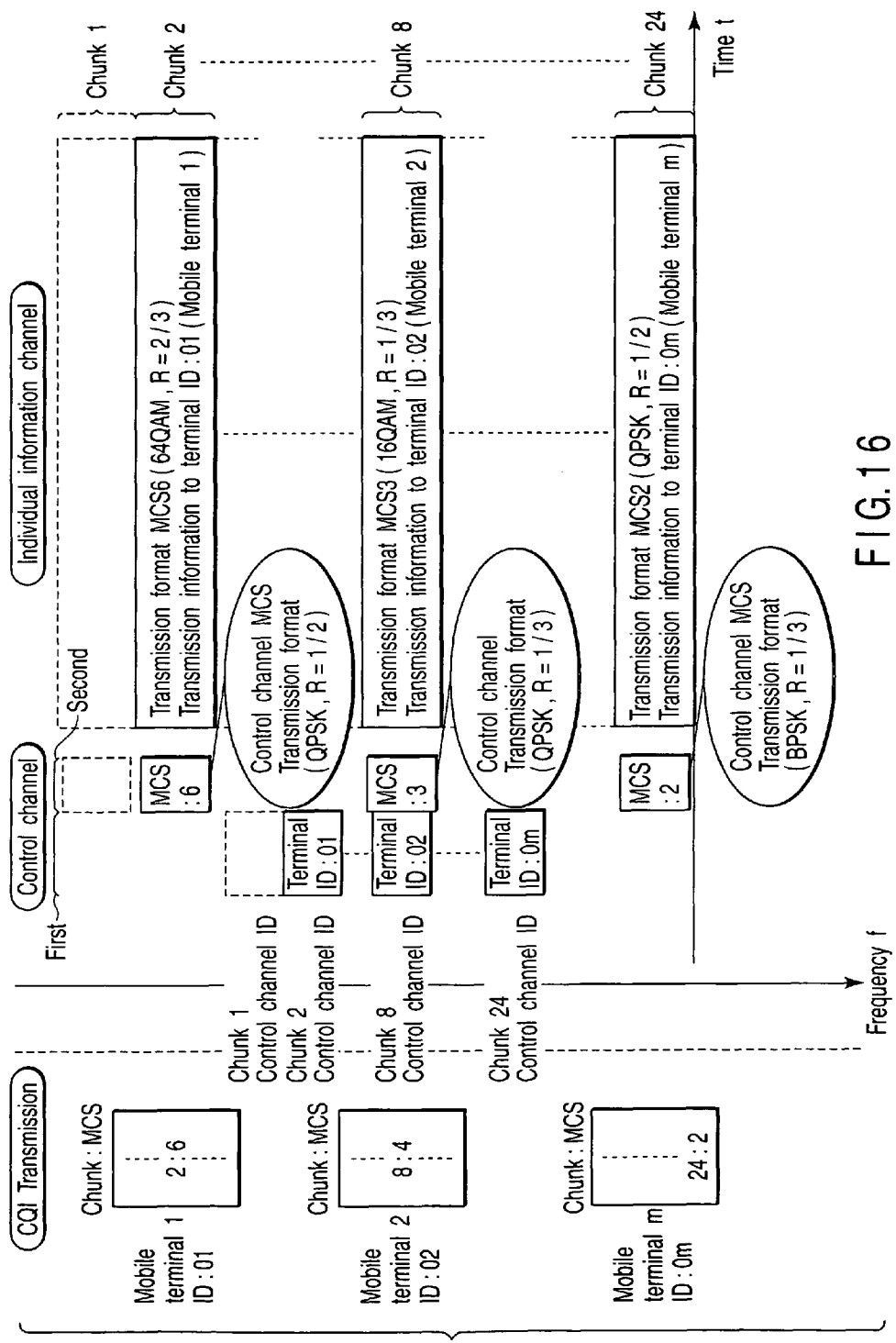
F I G. 16

RADIO COMMUNICATIONS SYSTEM, AND BASE STATION APPARATUS AND MOBILE RADIO TERMINAL APPARATUS EMPLOYED IN THE SYSTEM

CROSS-REFERENCE TO RELATED APPLICATIONS

This application is based upon and claims the benefit of priority from prior Japanese Patent Application No. 2006-007833, filed Jan. 16, 2006, the entire contents of which are incorporated herein by reference.

BACKGROUND OF THE INVENTION

1. Field of the Invention

This invention relates to a radio communications system making multi-carrier radio transmission from base stations to a plurality of mobile stations to execute a frequency band allocation control and an application control to modulation and coding.

2. Description of the Related Art

In a conventional radio communications system, a mobile terminal measures a radio transmission path quality, determines a receivable transmission format (combination of modulation and coding rates) on the basis of the measurement value, and transmits this information to a base station as CQI (Channel Quality Indication) (refer to, for example, 3GPP TS 25.214 V5.11.0 (2005-06) 6A HS-DSCH-related procedures).

The base station selects a transmission format based on the CQI, and transmits the transmission information over an individual information channel. The kind of the individual information channel is transmitted immediately before transmission of the transmission information as the control information. The mobile terminal receives information about the transmission format of the individual information channel, over a control channel, and receives the transmission information in accordance with the transmission format.

In such a radio communications system, if an error occurs in the reception of the control channel at the mobile terminal, the reception cannot be conducted since a correct transmission format of the individual information channel is unknown. For this reason, an error tolerance of the control channel needs to be sufficiently greater than an error tolerance of the individual information channel.

In addition, an OFDM (Orthogonal Frequency Division Multiplexing) system is one of multi-carrier systems making communications simultaneously employing a number of subcarriers (refer to, for example, 3GPP TSG RAN1#40bis R1-050249 Downlink Multiple Access Scheme for Evolved UTRA Multiplexing of Common Channel and Shared Data Channel). A specific frequency can be allocated to each mobile terminal, by each subcarrier. This system is similar to the conventional FDM (Frequency Division Multiplexing) system from the viewpoint of allocating a specific frequency to each mobile terminal. In the multi-carrier system such as the OFDM system, however, each mobile terminal receives all the multi-carrier subcarriers simultaneously, executes receiving processing of multi-carrier signals and takes out subcarriers to be received. The OFDM system is different from the conventional FDM system in this point.

A group of subcarriers is called a chunk and the subcarriers are allocated by chunk to the terminal, in 3GPP TSG RAN1#40bis R1-050249 Downlink Multiple Access Scheme for Evolved UTRA Multiplexing of Common Channel and Shared Data Channel. A single user can use a plurality of chunks. In the following descriptions, too, a group of subcarriers is called a chunk.

At present, however, a concrete scheme has not been clarified in relation to a configuration of the control channel to transmit the transmission format information and transmission band information of the individual information, in the radio communications system employing the frequency band allocation control and the application control for modulation and coding on the basis of the transmission path quality measured by the mobile terminal.

The settings for the reception of the individual information channel are obtained over the control channel. If the mobile terminal is not able to normally receive the control channel, the mobile terminal cannot receive the individual information channel. In other words, even if the reception quality of the individual information channel is sufficient, the reception of the individual information channel is insufficient when the reception quality of the control channel is insufficient.

BRIEF SUMMARY OF THE INVENTION

The present invention has been accomplished to solve the above-described problems. The object of the present invention is to provide a radio communications system capable of sufficiently high-quality control channel transmission based on reception quality in a case where a base station conducts multi-carrier communications with a plurality of mobile stations, and also provide the base station apparatus and the mobile radio terminal apparatus employed in this system.

To achieve this object, an aspect of the present invention is a radio communications system, conducting radio communications between a base station and a plurality of mobile stations. At least the radio communications from the base station to the mobile stations are conducted in a multi-carrier scheme. A transmission format of an individual information channel transmitted from the base station to the mobile stations is output over a control channel. The base station comprises first transmission means and second transmission means.

The first transmission means transmits identification information to identify each of the mobile stations, and format information representing the transmission format of an individual information channel, in association with each other, over the control channel. The second transmission means transmits transmission information for the mobile station represented by the identification information, in a transmission format represented by the format information transmitted over the control channel by the first transmission means, over an individual information channel of a frequency band including the control channel transmitted by the first transmission means.

The mobile station comprises first reception means and second reception means. The first reception means receives the identification information and the format information over the control channel. If the identification information received by the first reception means is to be transmitted to the own mobile station, the second reception means receives the individual information channel of the frequency band including the control channel, in the transmission format represented by the format information received by the first reception means together with the identification information.

Thus, the present invention can provide a radio communications system capable of sufficiently high-quality control channel transmission based on reception quality in a case where a base station conducts multi-carrier communications with a plurality of mobile stations, and also provide the base station apparatus and the mobile radio terminal apparatus employed in this system.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 7 is a block diagram showing a configuration of the mobile terminal in the radio communications system according to the present invention;

FIG. 8 is a block diagram showing a configuration of the base station in the radio communications system according to the present invention;

FIG. 11 is a table of MCS numbers employed in the communications conducted between the base station and the mobile terminal in the radio communications system according to the present invention;

FIG. 12 is an illustration for explanation of the control channel and the individual information channel of information transmitted from the base station to the mobile terminal, in the radio communications system according to the present invention;

FIG. 16 is an illustration for explanation of the control channel and the individual information channel of information transmitted from the base station to the mobile terminal, in the radio communications system according to the present invention.

DETAILED DESCRIPTION OF THE INVENTION

Embodiments of the present invention will be explained below with reference to the accompanying drawings.

Figure 1:
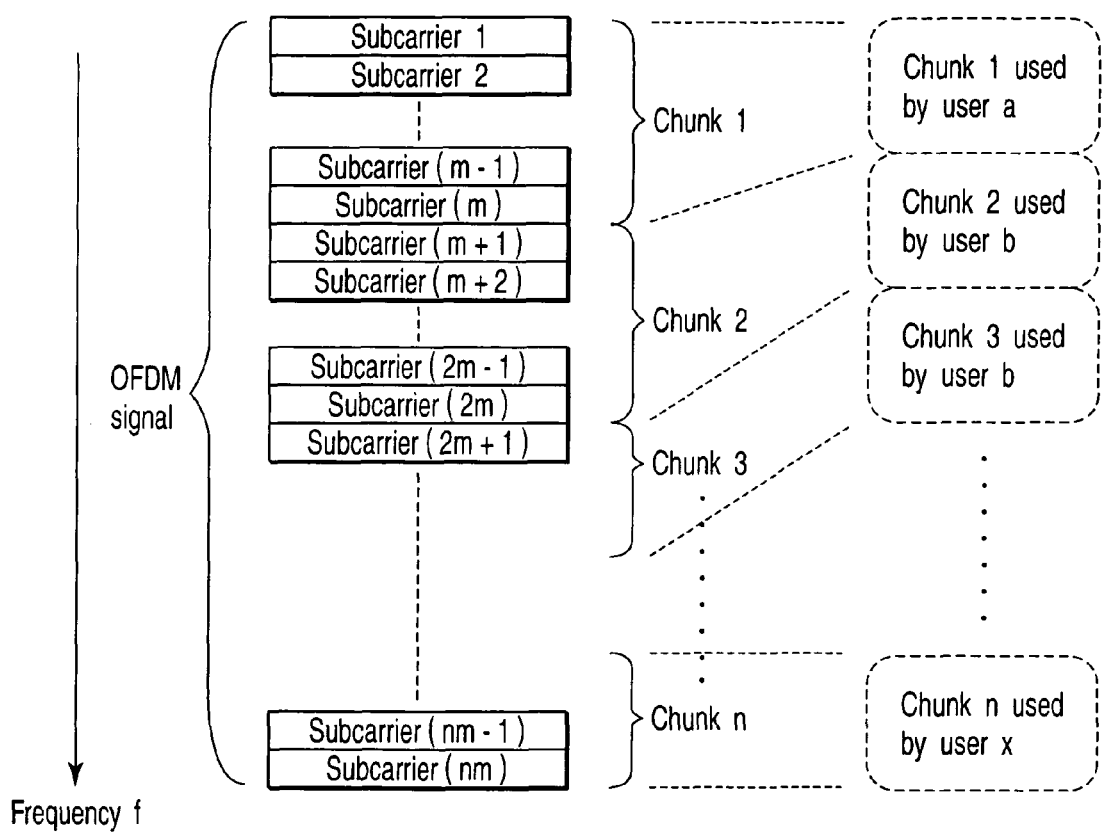
FIG. 1 is an illustration for explanation of a relationship between subcarriers and chunks in an OFDM signal of a radio communications system according to the present invention.

In the present invention, a radio communications system described below is assumed as a radio communications system conducting a frequency band allocation control, and an application control to modulation and coding. In a multi-carrier system such as an OFDM system simultaneously receiving information of a plurality of bands, a mobile terminal measures a radio transmission path quality of each band (chunk), and transmits a base station of the measurement result as CQI. In an example of FIG. 1, an OFDM (Orthogonal Frequency Division Multiplexing) signal includes (n×m) subcarriers, which are grouped into number n of chunks including number m of subcarriers. A single user can also use a plurality of chunks.

The base station selects a transmission format and the band (chunk) to be used, in relation to the individual information channel over which the transmission information should be transmitted, from the CQI information transmitted from each mobile terminal and the other information that the base station itself has. The information items of the transmission format and band (chunk) to be used, thus selected, as related to the individual information channel, are transmitted to the mobile terminal over the control channel before transmission of the individual information channel.

Figure 2:
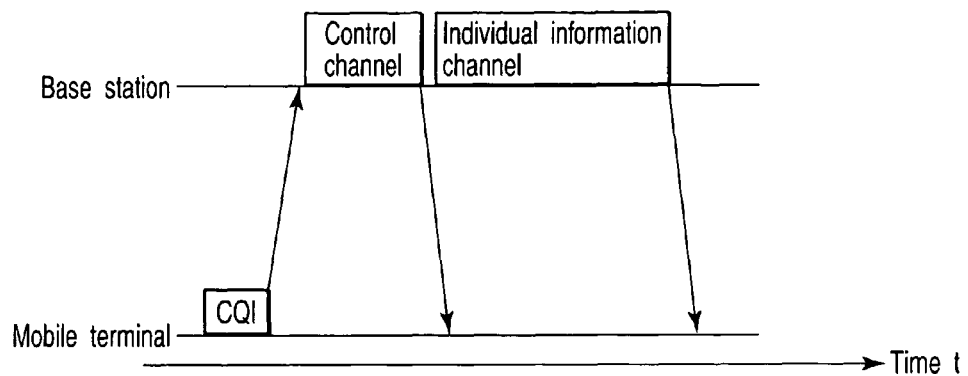
FIG. 2 is an illustration for explanation of communications conducted between a base station and a mobile terminal in the radio communications system according to the present invention.

In other words, as shown in FIG. 2, the mobile terminal transmits the CQI of each chunk to the base station. The base station transmits to the mobile terminal the information of the transmission format and the information of the band (chunk) to be used, as related to the individual information channel. The mobile terminal receives all the information items of the control channel, recognizes the band to be used over the individual information channel, on the basis of the information transmitted over the control channel including identification data (ID) which is preliminarily assigned to the mobile terminal, further recognizes the transmission format to be used, sets the receiving function, and receives the information of the individual information channel transmitted from the base station.

Figure 3:
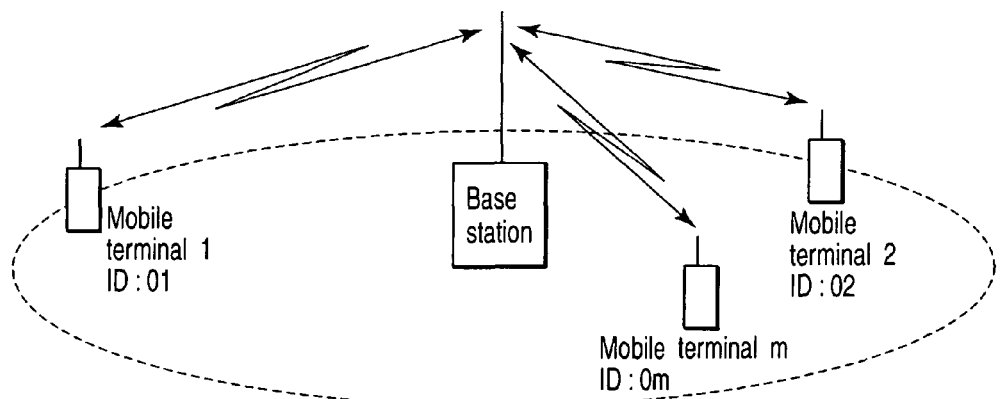
FIG. 3 is an illustration of a cellular system.
Figure 4:
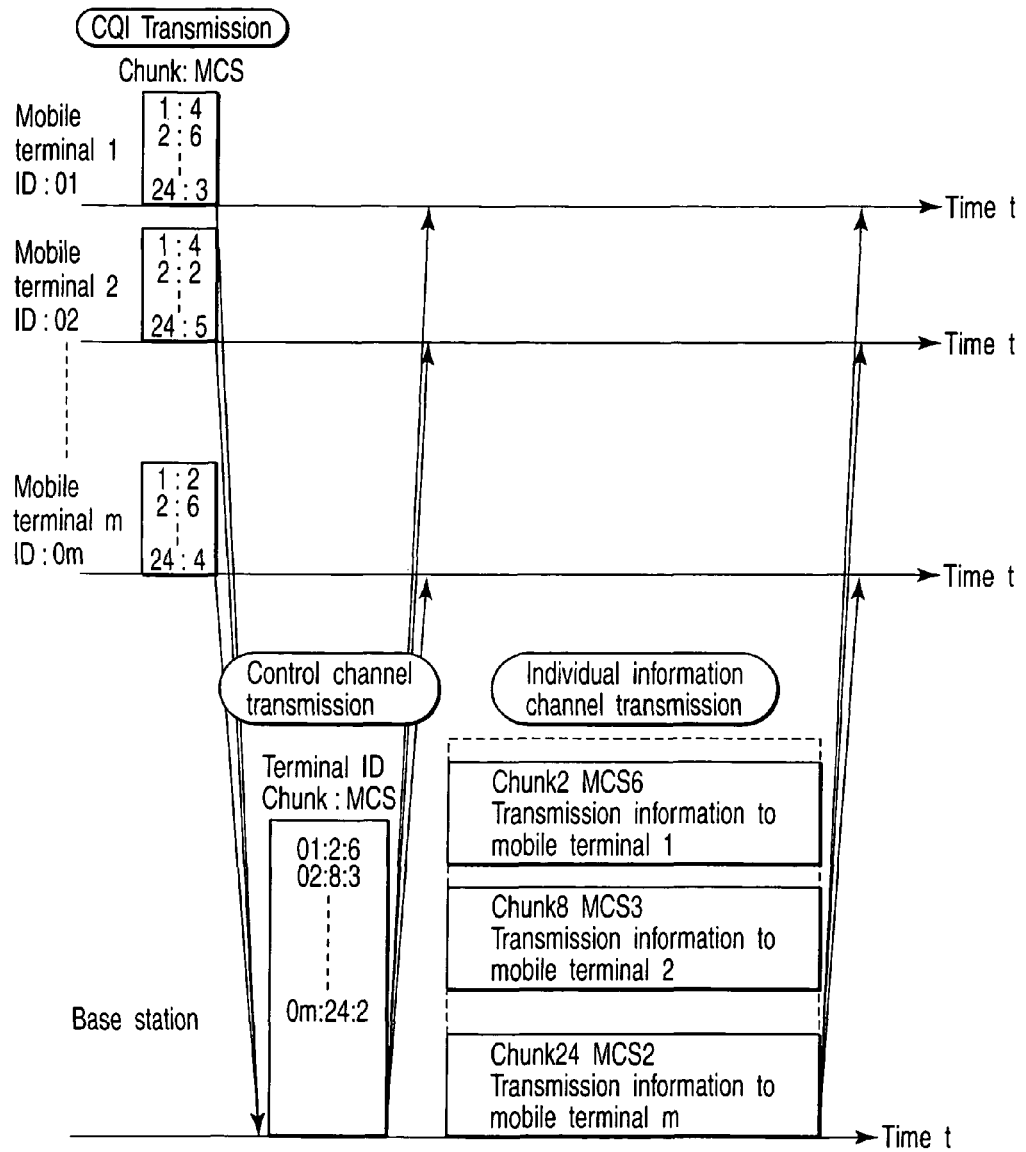
FIG. 4 is an illustration for explanation of communications conducted between a base station and a mobile terminal in the radio communications system according to the present invention.

Next, an application of the present invention to a cellular system is described. FIG. 3 illustrates a concept of the cellular system. A single base station is connected simultaneously with a plurality of mobile terminals. FIG. 4 illustrates signal flows in a case where the information is transmitted from the base station to the mobile terminals. At the mobile terminals, the transmission path quality for each chunk is measured and transmitted as the CQI. Various transmission schemes of the CQI are considered but the receivable transmission format (combination of the modulation and the coding rate) for each chunk obtained from the transmission path quality is employed here.

Figures 5, 6:
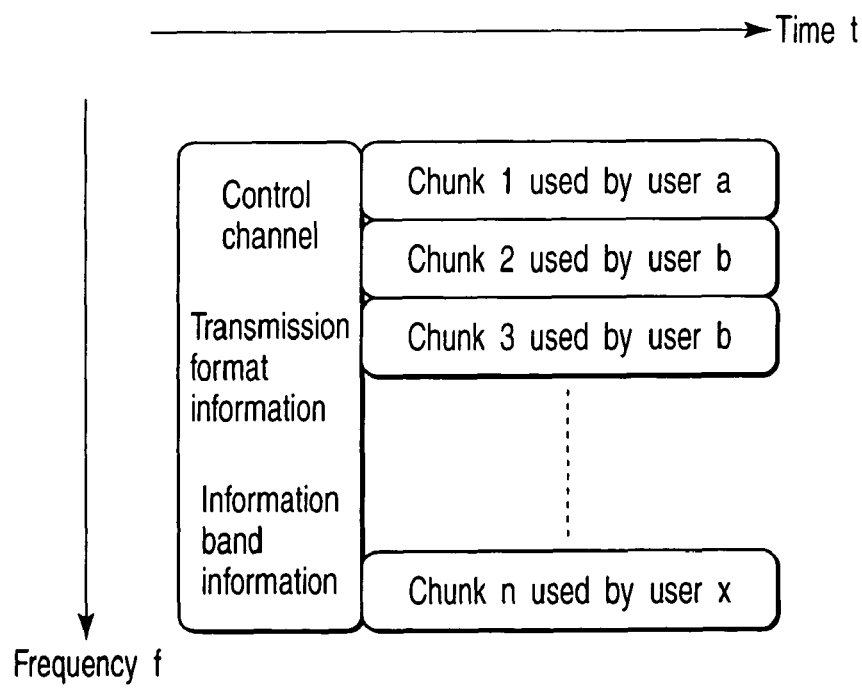
FIG. 5 is a table of MCS numbers employed in the communications conducted between a base station and a mobile terminal in the radio communications system according to the present invention.
FIG. 6 is an illustration for explanation of a control channel and an individual information channel employed in transmission from the base station to the mobile terminal, in the radio communications system according to the present invention.

As shown in FIG. 5, the MCS number is allocated to each transmission format (combination of the modulation and the coding rate). As for the CQI, the MCS number for each chunk is transmitted. The modulated multivalued number is 2 in QPSK, 4 in 16 QAM, and 6 in 64 QAM. The coding rate is (number of information bits/number of coding bits). By transmitting the CQI having the great modulated multivalued number, high coding rate and high transmission rate to the chunk having a good transmission path quality, the base station is notified of the matter that there is possibility of transmitting a number of information items in the same band, at a high transmission rate.

On the basis of the CQI transmitted from each of the mobile terminals and the other information (for example, the amount of information to be transmitted, the electric power to be fed, the previous band allocation, etc.) stored in the base station, the base station determines the chunk to be used for the information transmission to each of the mobile terminals and the transmission format (MCS: Modulation and Coding Set) to be used therefor.

At this time, a number of information items can be transmitted by selecting and determining a combination of the mobile terminal and the chunk for which the CQI having the great modulated multivalued number, the high coding rate and the high transmission rate is designated. Even with the combination of the chunk and the transmission format having a high transmission rate for the CQI, the mobile terminal does not always transmit the information at a high transmission rate.

The base station notifies each mobile terminal of the chunk and the transmission format information determined for each mobile terminal, over the control channel. Subsequently, the base station transmits the information of the individual information channel to the mobile terminal by using the chunk and the transmission format notified over the control channel.

The mobile terminal receives the information of all the control channels, recognizes the chunk and the transmission format, of the control channel having the ID preliminarily assigned to the mobile terminal, and receives the information of the individual information channel on the basis of the chunk and the transmission format.

FIG. 6 illustrates the configuration of the control channel and the individual information channel. On the control channel, the transmission band information representing the allocation of the bands (chunks) to the individual information channels of the mobile terminals, and the transmission format information representing the transmission format used for the information transmission are represented.

3GPP TSG RAN1#43 R1-051331 discloses changing the transmission format of the control channel transmitted immediately before the transmission of the individual information channel shown in FIG. 6, in accordance with the CQI. However, this simply discloses existence of domains having different transmission formats, but does not disclose a concrete configuration of the control channel.

Next, the radio communications system according to a first embodiment of the present invention is described. FIG. 7 illustrates a configuration of the mobile terminal in the radio communications system according to the first embodiment. FIG. 8 illustrates a configuration of the base station in the radio communications system according to the first embodiment. As the radio communications system illustrated in the drawings, a cellular system employing the OFDM (Orthogonal Frequency Division Multiplexing) as the modulation scheme in a downstream line in which the base station transmits signals to the mobile terminal, is assumed.

Figure 9:
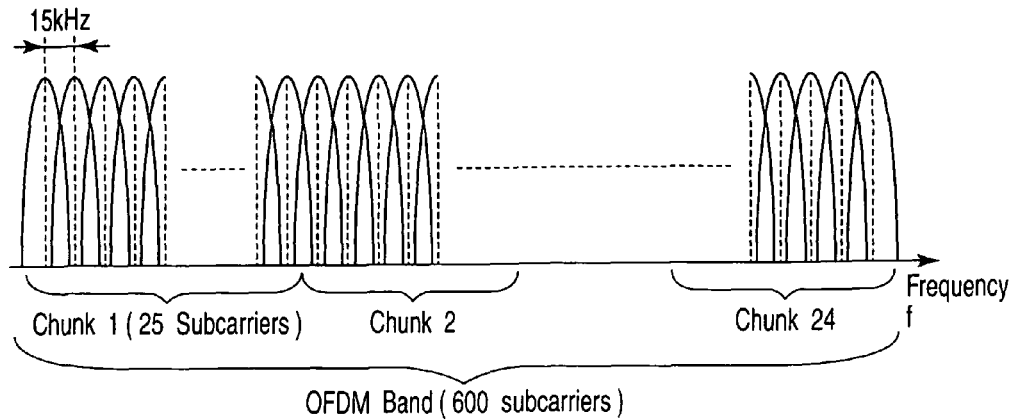
FIG. 9 is a table of OFDM numbers employed in the communications conducted between a base station and a mobile terminal in the radio communications system according to the present invention.

In the OFDM modulation, high-speed data signals are converted into low-speed narrow-band data signals, which are transmitted in parallel in the frequency axis by a plurality of subcarriers. In the radio communications system, the OFDM is composed of 600 subcarriers, at a subcarrier interval of 15 kHz, as shown in FIG. 9. Allocated to the individual information channel are 24 bands (chunks) each including 25 subcarriers. The mobile terminal receives the OFDM signal, i.e. simultaneously receives all of 24 chunks.

First, the configuration of the mobile terminal is described with reference to FIG. 7. The mobile terminal comprises a control unit 100, a speech (information) coding unit 101, a channel coding unit 102, a modulation unit 103, a transmission RF unit 104, a duplexer 105, an antenna 106, a reception RF unit 107, an FFT (time-frequency domain conversion) unit 108, a chunk selection unit 109, a demodulation unit 110, a channel decoding unit 111, and a speech (information) decoding unit 112.

A speech signal is encoded as speech information by the speech (information) coding unit 101. The channel coding unit 102 codes the speech information together with the CQI supplied from the control unit 100. The information thus obtained is used for modulation of the carrier in the modulation unit 103.

The transmission RF unit 104 upconverts the signal output from the modulation unit 103 into a radio frequency of the bands instructed by the control unit 100, and radiates the radio frequency into space via the duplexer 105 and the antenna 106, to transmit the radio frequency to the base station.

The upstream communications conducted with the base station by the mobile terminal may be communications in a single carrier scheme such as FDMA (Frequency Division Multiple Access), TDMA (Time Division Multiple Access), CDMA (Code Division Multiple Access), or may be the communications in the multi-carrier scheme such as OFDM, similarly to the downstream communications conducted with the mobile terminal by the base station.

The reception RF unit 107 downconverts the radio frequency receive signal input via the antenna 106 and the duplexer 105 into a signal of a predetermined frequency, which is output to the FFT (time-frequency domain conversion) unit 108. The FFT (time-frequency domain conversion) unit 108 processes the input signal by fast Fourier transform and thereby converts a signal of a time domain into a signal of a frequency domain.

The chunk selection unit 109 selects the signal of the chunk in the frequency band instructed by the control unit 100 and outputs the signal to the demodulation unit 110. The demodulation unit 110 demodulates the signal output from the chunk selection unit 109. The signal thus demodulated is decoded by the channel decoding unit 111. The information of the control channel obtained by the decoding is output to the control unit 100.

The channel decoding unit 111 measures the transmission path quality and notifies the control unit 100 of the measurement result. Then, the channel decoding unit 111 decodes the signal of the individual information channel, on the basis of the transmission format instructed by the control unit 100. The speech (information) decoding unit 112 decodes the signal decoded by the channel decoding unit 111 to obtain the speech signal.

The control unit 100 controls all the units of the mobile terminal, so as to implement the communications in the OFDM modulation scheme with the base station. For this reason, the control unit 100 comprises functions such as a control of instructing the chunk selected by the chunk selection unit 109, a control of allowing the channel decoding unit 111 to measure the transmission path quality of each of the chunks, a control of generating the CQI on the basis of the measured transmission path quality, a control of allowing the channel decoding unit 111 to decode the individual information channel on the basis of the information of the control channel decoded by the channel decoding unit 111.

Next, the configuration of the base station is described with reference to FIG. 8. The base station comprises a control unit 200, speech (information) coding units 211 to 21n, channel coding units 221 to 22n, modulation units 231 to 23n, a chunk allocation unit 241, an IFFT (frequency-time domain conversion) unit 242, a transmission RF unit 243, a duplexer 244, an antenna 245, a reception RF unit 246, a frequency channel demultiplexer 247, demodulation units 251 to 25m, channel decoding units 261 to 26m, and speech (information) decoding units 271 to 27m.

Each of the speech (information) coding units 211 to 21n encodes a speech signal to obtain speech information. The speech information items, and the information about the transmission format supplied from the control unit 200 and the terminal ID to identify the mobile terminal as supplied from the control unit 200, are coded by the channel coding units 221 to 22n that correspond to the speech (information) coding units 211 to 21n, respectively, and are used for modulation of the carriers by the modulation units 231 to 23n corresponding to the channel coding units 221 to 22n, respectively.

The chunk allocation unit 241 allocates chunks to the respective outputs of the modulation units 231 to 23n, in accordance with the instruction of the control unit 200, and outputs the outputs to the IFFT (frequency-time domain conversion) unit 242. The allocation of the chunks is controlled by the control unit 200 such that the information of the transmission format corresponds to the allocation of the chunks.

The IFFT (frequency-time domain conversion) unit 242 conducts inverse fast Fourier transform, for the signals to which the chunks are allocated by the chunk allocation unit 241, and thereby converts the frequency domain signal into a time domain signal. The signal output from the IFFT (frequency-time domain conversion) unit 242 is upconverted into a radio frequency signal by the transmission RF unit 243. The radio frequency signal is radiated into space via the duplexer 244 and the antenna 245, and transmitted to the mobile terminal.

The reception RF unit 246 downconverts the radio frequency receive signal input via the antenna 245 and the duplexer 244 into a signal of a predetermined frequency and outputs the signal to the frequency channel demultiplexer 247. In accordance with the instruction from the control unit 200, the frequency channel demultiplexer 247 demultiplexes the downconverted signal in the multiplexed state into signals of the respective frequencies, which are output to the demodulation units 251 to 25m, respectively.

The demodulation units 251 to 25m demodulate the input signals. The signals thus demodulated are decoded by the channel decoding units 261 to 26m, respectively, and further decoded by the speech (information) decoding units 271 to 27m, respectively, and the speech signals are thereby obtained. The CQI transmitted from the mobile terminal, in the information obtained by the decoding conducted by the channel decoding units 261 to 26m, is output to the control unit 200.

The control unit 200 controls all the units of the base station so as to implement the communications in the OFDM modulation scheme with a plurality of mobile terminals. For this reason, the control unit 200 comprises functions such as a control of demultiplexing the multiplexed channels by the frequency channel demultiplexer 247 and receiving each of the channels, a control of acquiring the CQI transmitted by the mobile terminal over each of the channels, by the channel decoding units 261 to 26m and determining the transmission format of the individual information channel to be transmitted for the mobile terminal, on the basis of the acquired information, and a control of transmitting the transmission format to the mobile terminal over the control channel of the same chunk as the individual information channel employed for the information transmission.

Next, operations of the radio communications system having the above-described configuration is described. In the following descriptions, steps of transmitting the information from the base station to the mobile terminal over the individual channel, in the communications conducted between the base station and the mobile terminal, is focused. For simple explanation, the base station has a one-on-one relationship with the mobile terminal but, in fact, the single base station can respond to a plurality of mobile terminals simultaneously.

First, in the mobile terminal, the control unit 100 controls the chunk selection unit 109, to measure the transmission path quality of all the chunks, and the chunk selection unit 109 thereby outputs the signals of all the chunks. The demodulation unit 110 demodulates the signals of all the chunks and outputs the demodulated signals to the channel decoding unit 111.

The channel decoding unit 111 measures the transmission path quality of each chunk, on the basis of the demodulation result of all the chunks, and outputs the measurement result to the control unit 100. The control unit 100 generates the CQI of each chunk on the basis of the measurement result. The CQI, conducted on the basis of, for example, the MCS (Modulation and Coding Set) number table shown in FIG. 5, represents the type of the MCS modulation and the coding rate. The MCS number table is also stored in the base station.

Next, in the mobile terminal, the control unit 100 outputs the generated CQI of each chunk to the channel coding unit 102, to transmit the generated CQI of each chunk to the base station. The channel coding unit 102 codes each of the CQI input from the control unit 100 and the terminal ID (for example, "01") of the mobile terminal.

The information thus obtained is used for the modulation of the carriers in the modulation unit 103. The information is upconverted by transmission RF unit 104 into the radio frequency of the band designated by the control unit 100, which is transmitted to the base station via the duplexer 105 and the antenna 106.

In the base station, the radio signal transmitted from the mobile terminal is received by the reception RF unit 246 via the antenna 245 and the duplexer 244 and demultiplexed on every channel by the frequency channel demultiplexer 247, and the demultiplexed signals are output to the demodulation units 251 to 25m.

For example, if the signal of the mobile terminal is demultiplexed and output to the demodulation unit 251, the signal is demodulated by the demodulation unit 251 and decoded by the channel decoding unit 261 corresponding to the demodulation unit 251, and the CQI and the terminal ID "01" transmitted from the mobile terminal are thereby obtained. The CQI and the terminal ID "01" thus obtained are output to the control unit 200.

The control unit 200 determines the chunk (hereinafter called a designated chunk) employed for the transmission of the individual information channel to the mobile terminal (terminal ID "01") and the transmission format MCS, on the basis of the CQI and the other information items (for example, the amount of the information to be transmitted, the electric power to be transmitted, the previous band allocation, etc.) stored in the base station.

The transmission format MCS of the individual information channel is conducted on the basis of the MCS number table shown in FIG. 5. In the following descriptions, the identification number of the designated chunk is "2"and the identification number of the transmission format MCS is "6". The transmission format employed by the base station may not be the transmission format represented by the CQI transmitted from the mobile terminal (terminal ID "01").

When the control unit 200 determines the designated chunk "2" employed for the transmission of the individual information channel and the transmission format MCS "6" in this manner, the control unit 200 outputs the transmission format MCS "6" to any one of the channel coding units 221 to 22n together with the terminal ID "01". It is assumed here that they are output to the channel coding unit 221.

The channel coding unit 221 codes the information items of the transmission format MCS "6" and the terminal ID "01" and generates the signal of the control channel including these information items. The generated signal is used for the modulation by the modulation unit 231 corresponding to the channel coding unit 221 and output to the chunk allocation unit 241.

The control channel does not include the information of the chunk used for the transmission of the individual information channel. This is because the frequency band of the signal of the control channel is within the frequency band of the individual information channel whose use is designated by the control channel, i.e. the chunk "2" is used for both the control channel and the individual information channel. Since higher receiving quality than the receiving quality of the individual information channel is required by the control channel, use of the transmission format having a low transmission rate, such as BPSK, R=1/3, is determined in advance in both the base station and the mobile station.

The control unit 200 gives an instruction of allocation to the chunk allocation unit 241, such that the signal (i.e. the signal of the control channel) from the modulation unit 231 is transmitted over the designated chunk "2" determined together with the transmission format MCS "6". The chunk allocation unit 241 thereby allocates the designated chunk "2" to the output of the modulation unit 231 and outputs the output to the IFFT (frequency-time domain conversion) unit 242. In other words, the chunk allocation is conducted such that the control chunk for the mobile terminal (terminal ID "01") transmitted over the designated chunk "2".

The IFFT (frequency-time domain conversion) unit 242 conducts the inverse fast Fourier transform, for the signal to which the chunk is allocated by the chunk allocation unit 241. The signal thus obtained is upconverted into the radio frequency signal by the transmission RF unit 243. The radio frequency signal is radiated into space via the duplexer 244 and antenna 245 and transmitted to the mobile terminal.

In the base station, the processing to be described below is conducted to transmit the speech signal over the individual information channel, subsequently to the above-described transmission of the information over the control channel.

First, each of the speech (information) coding units 211 to 21n encodes the speech signal to obtain the speech information. It is assumed here that the speech signal to be transmitted to the mobile terminal (terminal ID "01") is encoded by the speech (information) coding unit 21n. The control unit 200 outputs the transmission format MCS "6" transmitted to the mobile terminal (terminal ID "01") over the control channel, and the terminal ID "01", to the channel coding unit 22n corresponding to the speech (information) coding unit 21n.

The channel coding unit 22n adds the terminal ID "01" to the speech information transmitted from the speech (information) coding unit 21n, and conducts the channel coding on the basis of the transmission format MCS "6". This result is used for the modulation of the carriers by the modulation unit 23n.

Figure 10:
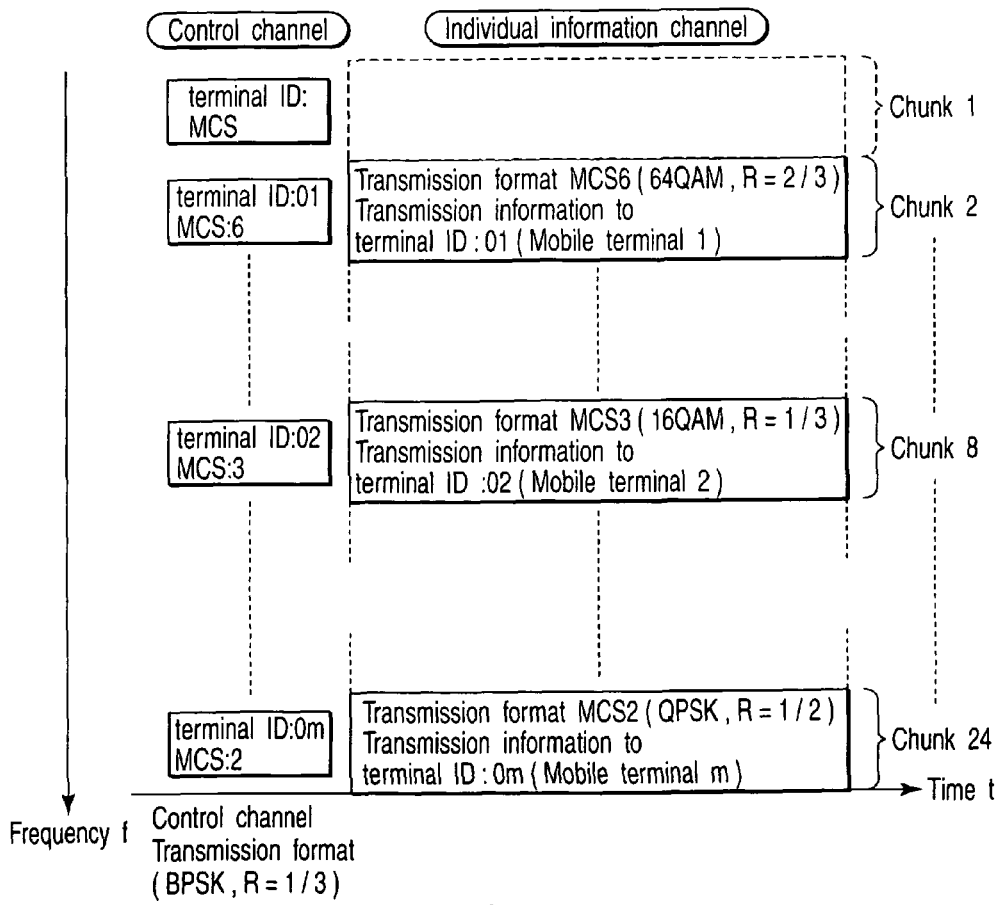
FIG. 10 is an illustration for explanation of a control channel and an individual information channel of information transmitted from the base station to the mobile terminal, in the radio communications system according to the present invention.

The control unit 200 gives an instruction of allocation to the chunk allocation unit 241 such that the signal from the modulation unit 23n is transmitted over the designated chunk "2" determined together with the transmission format MCS "6". The chunk allocation unit 241 thereby allocates the designated chunk "2" to the output of the modulation unit 23n and outputs the output to the IFFT (frequency-time domain conversion) unit 242. The chunk allocation is thereby conducted such that the individual information channel for the mobile terminal (terminal ID "01") is transmitted over the designated chunk "2" as shown in FIG. 10.

In the mobile terminal, the control unit 100 controls the chunk selection unit 109 to receive the control channels from all the chunks. The demodulation unit 110 demodulate all the chunks, and the channel decoding unit 111 decodes all the chunks in the modulation scheme BPSK as determined in advance together with the base station, at the coding rate R=1/3. The information of the control channel obtained by the decoding is output to the control unit 100.

The control unit 100 verifies the terminal ID included in the information of the control channel and detects that the chunk including the terminal ID "01" of the mobile terminal is "2". The control unit 100 thereby determines the designated chunk as "2", and detects the transmission format MCS "6" included in the information of the control channel transmitted over the designated chunk "2".

When the transmission format MCS "6" is thus detected, the control unit 100 controls the chunk selection unit 109 to select the designated chunk "2" at the timing of receiving the individual information channel, and thereby allows the demodulation unit 110 to demodulate the signal of the individual information channel of the designated chunk "2".

In addition, the control unit 100 refers to the MCS number table in FIG. 5, and notifies the channel decoding unit 111 of the modulation scheme "64 QAM (Quadrature Amplitude Modulation)" and the coding rate "2/3" in relation to the detected transmission format MCS "6".

The channel decoding unit 111 thereby decodes the signal of the individual information channel demodulated by the demodulation unit 110, in the modulation scheme "64 QAM", at the coding rate "2/3. The information thus decoded is decoded by the speech (information) decoding unit 112, and the speech signal to be transmitted to the mobile terminal (terminal ID "01") is thereby obtained.

In the radio communications system having the above-described configuration, when the base station transmits the transmission format of the individual information channel to the mobile terminal over the control channel, the control channel of the same chunk as the chunk used for the individual information channel is employed.

Therefore, since the chunk employed for the individual information channel is represented as the chunk of the control channel transmitted to the mobile terminal, the information to identify the chunk employed for the individual information channel does not need to be transmitted over the control channel, and the transmission efficiency can be thereby enhanced. In addition, since the transmission efficiency can be thud enhanced, the rate of the control channel can be lowered and, the transmitting quality of the control channel can be made higher than the transmitting quality of the individual information channel.

Furthermore, since the same chunk is employed for the control channel and the individual information channel, the frequency bands of both the channels are similar and the propagation characteristics of both the channels are substantially equivalent to each other. Therefore, occurrence of a circumstance that the individual information channel cannot be received while the control channel can be received can be restricted.

Next, a radio communications system according to a second embodiment of the present invention is described. In the radio communications system according to the second embodiment, new functions are added to the radio communications system according to the first embodiment. In the radio communications system according to the first embodiment, the modulation scheme of the control channel is fixed to BPSK, and the coding rate thereof is fixed at R=1/3 as shown in FIG. 10. In the radio communications system according to a second embodiment, the transmission format of the format channel is variable.

The mobile terminal and the base station of the radio communications system according to the second embodiment are apparently the same as the mobile terminal and the base station of the first embodiment shown in FIG. 7 and FIG. 8. Therefore, the second embodiment is described with reference to FIG. 7 and FIG. 8.

In addition, a cellular system employing a multi-carrier scheme such as the OFDM (Orthogonal Frequency Division Multiplexing) as the modulation scheme is assumed in a downstream line of transmitting signals from the base station to the mobile terminal, in the radio communications system according to the second embodiment, similarly to the radio communications system according to the first embodiment.

In the OFDM modulation scheme, a high-speed data signal is converted into a low-speed narrow-band data signal, which is transmitted in parallel in the frequency axis, by employing a plurality of subcarriers. The OFDM of the radio communications system is composed of 600 subcarriers, at a subcarrier interval of 15 kHz as shown in FIG. 9. Allocated to the individual information channel are 24 bands (chunks) each including 25 subcarriers. The mobile terminal receives the OFDM signal, i.e. simultaneously receives all of 24 chunks.

First, the configuration of the mobile terminal is described with reference to FIG. 7. The mobile terminal comprises the control unit 100, the speech (information) coding unit 101, the channel coding unit 102, the modulation unit 103, the transmission RF unit 104, the duplexer 105, the antenna 106, the reception RF unit 107, the FFT (time-frequency domain conversion) unit 108, the chunk selection unit 109, the demodulation unit 110, the channel decoding unit 111, and the speech (information) decoding unit 112.

A speech signal is encoded as speech information by the speech (information) coding unit 101. The channel coding unit 102 codes the speech information together with the CQI (Channel Quality Indication) supplied from the control unit 100. The information thus obtained is used for the modulation of the carriers in the modulation unit 103.

The transmission RF unit 104 upconverts the signal output from the modulation unit 103 into a radio frequency of the bands instructed by the control unit 100, and radiates the radio frequency into space via the duplexer 105 and the antenna 106, to transmit the radio frequency to the base station.

The reception RF unit 107 downconverts the radio frequency receive signal input via the antenna 106 and the duplexer 105 into a signal of a predetermined frequency, which is output to the FFT (time-frequency domain conversion) unit 108. The FFT (time-frequency domain conversion) unit 108 processes the input signal by fast Fourier transform and thereby converts a signal of a time domain into a signal of a frequency domain.

The chunk selection unit 109 selects the signal of the chunk in the frequency band instructed by the control unit 100 and outputs the signal to the demodulation unit 110. The demodulation unit 110 demodulates the signal output from the chunk selection unit 109. The signal thus demodulated is decoded by the channel decoding unit 111. The information of the control channel obtained by the decoding is output to the control unit 100.

The channel decoding unit 111 measures the transmission path quality and notifies the control unit 100 of the measurement result. Then, the channel decoding unit 111 decodes the signal of the individual information channel, on the basis of the transmission format instructed by the control unit 100. The speech (information) decoding unit 112 decodes the signal decoded by the channel decoding unit 111 to obtain the speech signal.

The control unit 100 controls all the units of the mobile terminal, so as to implement the communications in the OFDM modulation scheme with the base station. For this reason, the control unit 100 comprises functions such as a control of instructing the chunk selected by the chunk selection unit 109, a control of allowing the channel decoding unit 111 to measure the transmission path quality of each of the chunks, a control of generating the CQI on the basis of the measured transmission path quality, a control of allowing the channel decoding unit 111 to decode the control channel on the basis of the CQI, a control of allowing the channel decoding unit 111 to decode the individual information channel on the basis of the information of the control channel decoded by the channel decoding unit 111.

Next, the configuration of the base station is described with reference to FIG. 8. The base station comprises the control unit 200, the speech (information) coding units 211 to 21$n$, the channel coding units 221 to 22$n$, the modulation units 231 to 23$n$, the chunk allocation unit 241, the IFFT (frequency-time domain conversion) unit 242, the transmission RF unit 243, the duplexer 244, the antenna 245, the reception RF unit 246, the frequency channel demultiplexer 247, the demodulation units 251 to 25$m$, the channel decoding units 261 to 26$m$, and the speech (information) decoding units 271 to 27$m$.

Each of the speech (information) coding units 211 to 21$n$ encodes a speech signal to obtain speech information. The speech information items, and the information about the transmission format supplied from the control unit 200 and the information about the terminal ID to identify the mobile terminal as supplied from the control unit 200, are coded by the channel coding units 221 to 22$n$ that correspond to the speech (information) coding units 211 to 21$n$, respectively, and are used for the modulation of the carriers by the modulation units 231 to 23$n$ corresponding to the channel coding units 221 to 22$n$, respectively.

The chunk allocation unit 241 allocates the chunks to the respective outputs of the modulation units 231 to 23$n$, in accordance with the instruction of the control unit 200, and outputs the outputs to the IFFT (frequency-time domain conversion) unit 242. The allocation of the chunks is controlled by the control unit 200 such that the information of the transmission format corresponds to the allocation of the chunks.

The IFFT (frequency-time domain conversion) unit 242 conducts inverse fast Fourier transform, for the signals to which the chunks are allocated by the chunk allocation unit 241, and thereby converts the frequency domain signal into a time domain signal. The signal output from the IFFT (frequency-time domain conversion) unit 242 is upconverted into a radio frequency signal by the transmission RF unit 243. The radio frequency signal is radiated into space via the duplexer 244 and the antenna 245, and transmitted to the mobile terminal.

The reception RF unit 246 downconverts the radio frequency receive signal input via the antenna 245 and the duplexer 244 into a signal of a predetermined frequency and outputs the signal to the frequency channel demultiplexer 247. In accordance with the instruction from the control unit 200, the frequency channel demultiplexer 247 demultiplexes the downconverted signal in the multiplexed state into signals of the respective frequencies, which are output to the demodulation units 251 to 25*m*, respectively.

The demodulation units 251 to 25*m* demodulate the input signals. The signals thus demodulated are decoded by the channel decoding units 261 to 26*m*, respectively, and further decoded by the speech (information) decoding units 271 to 27*m*, respectively, and the speech signals are thereby obtained. The CQI transmitted from the mobile terminal, in the information obtained by the decoding conducted by the channel decoding units 261 to 26*m*, is output to the control unit 200.

The control unit 200 controls all the units of the base station so as to implement the communications in the OFDM modulation scheme with a plurality of mobile terminals. For this reason, the control unit 200 comprises functions such as a control of demultiplexing the multiplexed channels by the frequency channel demultiplexer 247 and receiving each of the channels, a control of acquiring the CQI transmitted by the mobile terminal over each of the channels, by the channel decoding units 261 to 26*m* and determining the transmission format of each of the control channel and the individual information channel to be transmitted for the mobile terminal, on the basis of the acquired information, and a control of transmitting the transmission format to the mobile terminal over the control channel of the same chunk as the individual information channel employed for the information transmission.

Next, operations of the radio communications system having the above-described configuration are described. In the following descriptions, steps of transmitting the information from the base station to the mobile terminal over the individual channel, in the communications conducted between the base station and the mobile terminal, is focused. For simple explanation, the base station has a one-on-one relationship with the mobile terminal but, in fact, the single base station can respond to a plurality of mobile terminals simultaneously.

First, in the mobile terminal, the control unit 100 controls the chunk selection unit 109, to measure the transmission path quality of all the chunks, and the chunk selection unit 109 thereby outputs the signals of all the chunks. The demodulation unit 110 demodulates the signals of all the chunks and outputs the demodulated signals to the channel decoding unit 111.

The channel decoding-unit 111 measures the transmission path quality of each chunk, on the basis of the demodulation result of all the chunks, and outputs the measurement result to the control unit 100. The control unit 100 generates the CQI of each chunk on the basis of the measurement result. The CQI, conducted on the basis of, for example, the MCS (Modulation and Coding Set) number table shown in FIG. 11, represents the type of the MCS modulation for each of the individual information channel and the control channel, and the coding rate.

The MCS number table is also stored in the base station. In this table, the control channel is set to have a relatively higher quality than the individual information channel, with the same receive S/N (signal to noise ratio). For example, the channel decoding unit 111 selects "5" as the identification number of the transmission format MCS, in relation to the CQI having the chunk "2".

Next, in the mobile terminal, the control unit 100 outputs the generated CQI of each chunk to the channel coding unit 102, to transmit the generated CQI of each chunk to the base station. The channel coding unit 102 codes each of the CQI input from the control unit 100 and the terminal ID (for example, "01") of the mobile terminal.

The information thus obtained is used for the modulation of the carriers in the modulation unit 103. The information is upconverted by transmission RF unit 104 into the radio frequency of the band designated by the control unit 100, which is transmitted to the base station via the duplexer 105 and the antenna 106.

In the base station, the radio signal transmitted from the mobile terminal is received by the reception RF unit 246 via the antenna 245 and the duplexer 244 and demultiplexed on every channel by the frequency channel demultiplexer 247, and the demultiplexed signals are output to the demodulation units 251 to 25*m*.

For example, if the signal of the mobile terminal is demultiplexed and output to the demodulation unit 251, the signal is demodulated by the demodulation unit 251 and decoded by the channel decoding unit 261 corresponding to the demodulation unit 251, and the CQI and the terminal ID "01" transmitted from the mobile terminal are thereby obtained. The CQI and the terminal ID "01" thus obtained are output to the control unit 200.

The control unit 200 determines the chunk (hereinafter called a designated chunk) employed for the transmission of the individual information channel to the mobile terminal (terminal ID "01") and the transmission format MCS, on the basis of the CQI and the other information items (for example, the amount of the information to be transmitted, the electric power to be transmitted, the previous band allocation, etc.) stored in the base station. The transmission format MCS of the individual information channel is conducted on the basis of the MCS number table shown in FIG. 11.

First, the control unit 200 determines the designated chunk and the transmission format of the individual information channel. In the following descriptions, it is assumed that "2" is selected as the identification number of the designated chunk. As for the chunk "2", the mobile terminal designates "5" as the identification number of the transmission format MCS. In the case of the identification number "5" of the transmission format MCS, the modulation scheme QPSK of the control channel and the coding rate R=1/2 are designated.

Fore this reason, the control unit 200 selects the combination of the determined transmission format of the individual information channel and the MCS number at which the modulation scheme of the control channel is QPSK and the coding rate is R=1/2, in the MCS number table shown in FIG. 11. The identification number of the transmission format MCS is, for example, "6". The transmission format employed by the base station may not be the transmission format (identification number "5" of MCS) represented by the CQI transmitted from the mobile terminal (terminal ID "01"). However, the contents on the control channel are the same.

When the control unit 200 determines the designated chunk "2" employed for the transmission of the individual information channel and the transmission format MCS "6" in this manner, the control unit 200 outputs the transmission format MCS "6" to any one of the channel coding units 221 to 22n together with the terminal ID "01". It is assumed here that they are output to the channel coding unit 221.

The channel coding unit 221 codes the information items of the transmission format MCS "6" and the terminal ID "01" and generates the signal of the control channel including these information items. The generated signal is used for the modulation by the modulation unit 231 corresponding to the channel coding unit 221 and output to the chunk allocation unit 241.

The control channel does not include the information of the chunk used for the transmission of the individual information channel. This is because the frequency band of the signal of the control channel is within the frequency band of the individual information channel whose use is designated by the control channel, i.e. the chunk "2" is used for both the control channel and the individual information channel. Since higher receiving quality than the receiving quality of the individual information channel is required by the control channel, use of the transmission format having a low transmission rate, such as BPSK, R=1/2, is determined in advance in both the base station and the mobile station.

The control unit 200 gives an instruction of allocation to the chunk allocation unit 241, such that the signal (i.e. the signal of the control channel) from the modulation unit 231 is transmitted over the designated chunk "2" determined together with the transmission format MCS "6". The chunk allocation unit 241 thereby allocates the designated chunk "2" to the output of the modulation unit 231 and outputs the output to the IFFT (frequency-time domain conversion) unit 242. In other words, the chunk allocation is conducted such that the control chunk for the mobile terminal (terminal ID "01") transmitted over the designated chunk "2".

The IFFT (frequency-time domain conversion) unit 242 conducts the inverse fast Fourier transform, for the signal to which the chunk is allocated by the chunk allocation unit 241. The signal thus obtained is upconverted into the radio frequency signal by the transmission RF unit 243. The radio frequency signal is radiated into space via the duplexer 244 and antenna 245 and transmitted to the mobile terminal.

In the base station, the processing to be described below is conducted to transmit the speech signal over the individual information channel, subsequently to the above-described transmission of the information over the control channel.

First, each of the speech (information) coding units 211 to 21n encodes the speech signal to obtain the speech information. It is assumed here that the speech signal to be transmitted to the mobile terminal (terminal ID "01") is encoded by the speech (information) coding unit 21n. The control unit 200 outputs the transmission format MCS "6" transmitted to the mobile terminal (terminal ID "01") over the control channel, and the terminal ID "01", to the channel coding unit 22n corresponding to the speech (information) coding unit 21n.

The channel coding unit 22n adds the terminal ID "01" to the speech information transmitted from the speech (information) coding unit 21n, and conducts the channel coding on the basis of the transmission format MCS "6". This result is used for the modulation of the carriers by the modulation unit 23n.

The control unit 200 gives an instruction of allocation to the chunk allocation unit 241 such that the signal from the modulation unit 23n is transmitted over the designated chunk "2" determined together with the transmission format MCS "6". The chunk allocation unit 241 thereby allocates the designated chunk "2" to the output of the modulation unit 23n and outputs the output to the IFFT (frequency-time domain conversion) unit 242. The chunk allocation is thereby conducted such that the individual information channel for the mobile terminal (terminal ID "01") is transmitted over the designated chunk "2" as shown in FIG. 12.

In the mobile terminal, the control unit 100 controls the chunk selection unit 109 to receive the control channels from all the chunks. The demodulation unit 110 demodulates all the chunks, and the channel decoding unit 111 decodes all the chunks. The information of the control channel obtained by the decoding is output to the control unit 100.

The transmission format MCS "5" is designated for the chunk "2". Therefore, the control unit 100 controls the channel decoding unit 111 to conduct the reception by assuming that the information is transmitted from the base station, in the modulation scheme of QPSK, at the coding rate R=1/2.

The control unit 100 verifies the terminal ID included in the information of the control channel and detects that the chunk including the terminal ID "01" of the mobile terminal is "2". The control unit 100 thereby determines the designated chunk as "2", and detects the transmission format MCS "6" included in the information of the control channel transmitted over the designated chunk "2".

When the transmission format MCS "6" is thus detected, the control unit 100 controls the chunk selection unit 109 to select the designated chunk "2" at the timing of receiving the individual information channel, and thereby allows the demodulation unit 110 to demodulate the signal of the individual information channel of the designated chunk "2".

In addition, the control unit 100 refers to the MCS number table in FIG. 5, and notifies the channel decoding unit 111 of the modulation scheme "64 QAM (Quadrature Amplitude Modulation)" and the coding rate "2/3" in relation to the detected transmission format MCS "6".

The channel decoding unit 111 thereby decodes the signal of the individual information channel demodulated by the demodulation unit 110, in the modulation scheme "64 QAM", at the coding rate "2/3". The information thus decoded is decoded by the speech (information) decoding unit 112, and the speech signal to be transmitted to the mobile terminal (terminal ID "01") is thereby obtained.

In the radio communications system having the above-described configuration, when the base station transmits the transmission format of the individual information channel to the mobile terminal over the control channel, the control channel of the same chunk as the chunk used for the individual information channel is employed, similarly to the radio communications system according to the first embodiment.

Therefore, since the chunk employed for the individual information channel is represented as the chunk of the control channel transmitted to the mobile terminal, the information to identify the chunk employed for the individual information channel does not need to be transmitted over the control channel, and the transmission efficiency can be thereby enhanced. In addition, since the transmission efficiency can be thud enhanced, the rate of the control channel can be lowered and, the transmitting quality of the control channel can be made higher than the transmitting quality of the individual information channel.

Furthermore, since the same chunk is employed for the control channel and the individual information channel, the frequency bands of both the channels are similar and the propagation characteristics of both the channels are substantially equivalent to each other. Therefore, occurrence of a circumstance that the individual information channel cannot be received while the control channel can be received can be restricted.

Moreover, the transmission format of the control channel is made variable on the basis of the CQI output from the mobile terminal. Since the quality of the control channel can be controlled in accordance with the result of the transmission path estimate, the transmitting quality can be enhanced by lowering the transmission efficiency or, for example, a blank symbol can be use for the other purposes by improving the transmission efficiency.

If the number of symbols considered necessary for the modulation to transmit the control channel of the same contents is "1" in QPSK, the number of symbols is "2" in BPSK. For example, when the number of control channel symbols is "25", 25-bit encoded information can be transmitted in BPSK. In the modulation in QPSK, the modulated multivalued number is "2" indicating that 2-bit encoded information can be transmitted for one symbol, and the number of desired symbols is 13 (as 12.5 symbols are rounded up). The remainder of 12 symbols can be used for the other purposes.

Figure 13:
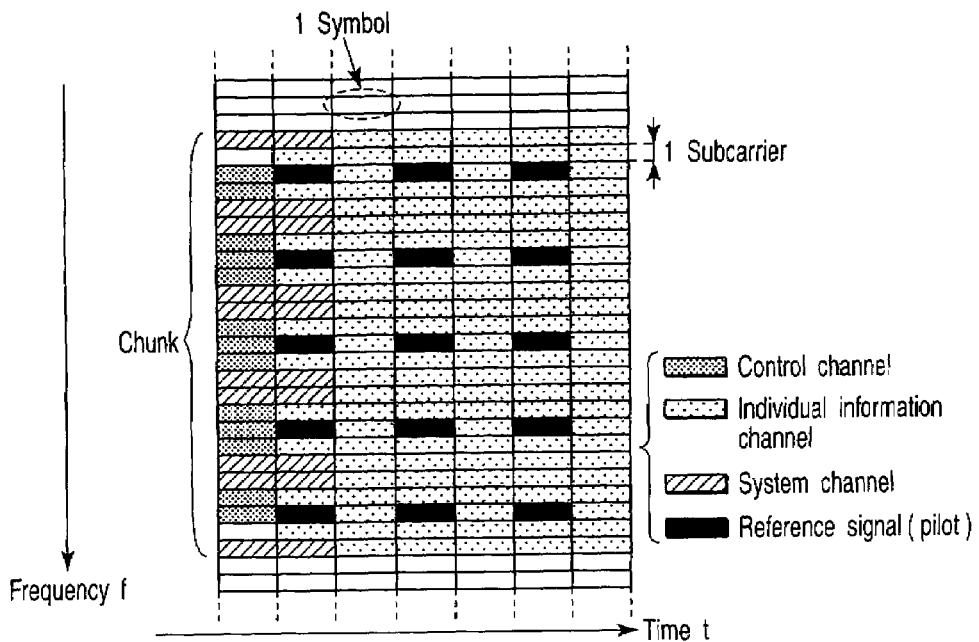
FIG. 13 is an illustration for explanation of a chunk employed in the transmission from base station to the mobile terminal, in the radio communications system according to the present invention.
Figure 14:
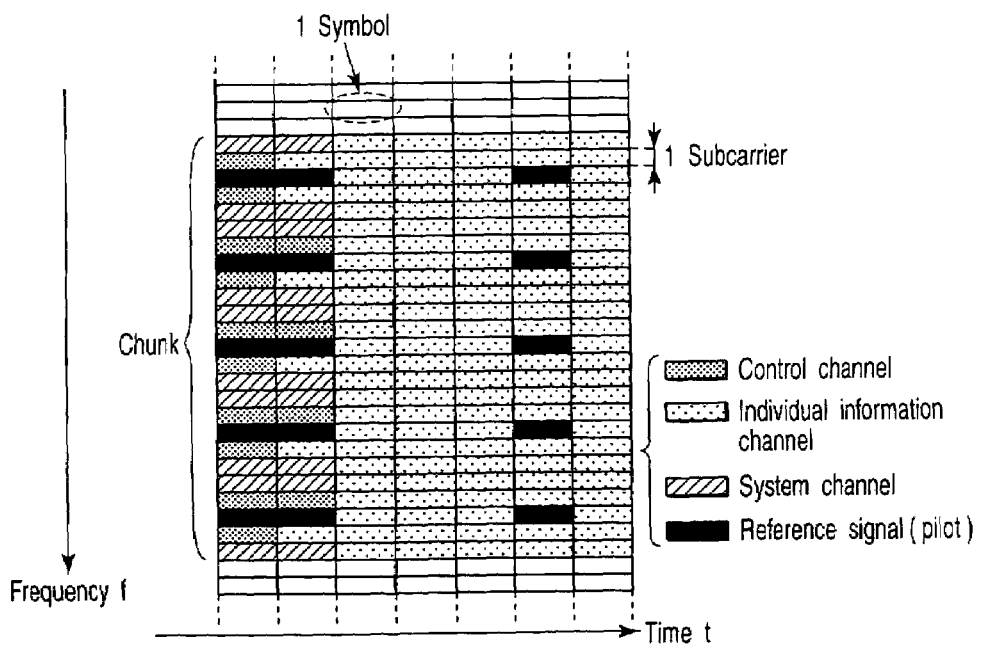
FIG. 14 is an illustration for explanation of a chunk employed in the transmission from base station to the mobile terminal, in the radio communications system according to the present invention.

FIG. 13 shows a case where of the remainder of 12 symbols, 5 symbols are used for the reference signal, 5 symbols are used for the individual information channel and 2 symbols are unused. FIG. 14 shows a case where of the remainder of 12 symbols, 5 symbols are used for the reference signal and 7 symbols are used for the individual information channel. The reference signal can effectively spread in the time direction.

On the system channel, the common information for all the mobile terminals existing in the cell, and the paging information calling the mobile terminal in a standby state are transmitted. The reference signal is the pilot signal, which is used to measure the propagation path characteristics and which becomes the basis of demodulating the other symbols or the basis of generating the CQI information.

In a case where the remainder symbol is used for the other purposes, the same advantage can be obtained by not using the remainder symbol at the original location of the control channel, but moving the location of the other original signal to a blank location and using the blank symbol location for the purpose of the reference signal, etc.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

For example, the information transmitted on the control channel includes the terminal ID representing which mobile terminal should receive the information, and the MCS number representing the transmission format of the individual information channel. These information items are transmitted by the same transmission format in the embodiments, but may be transmitted by different transmission formats.

Figure 15:
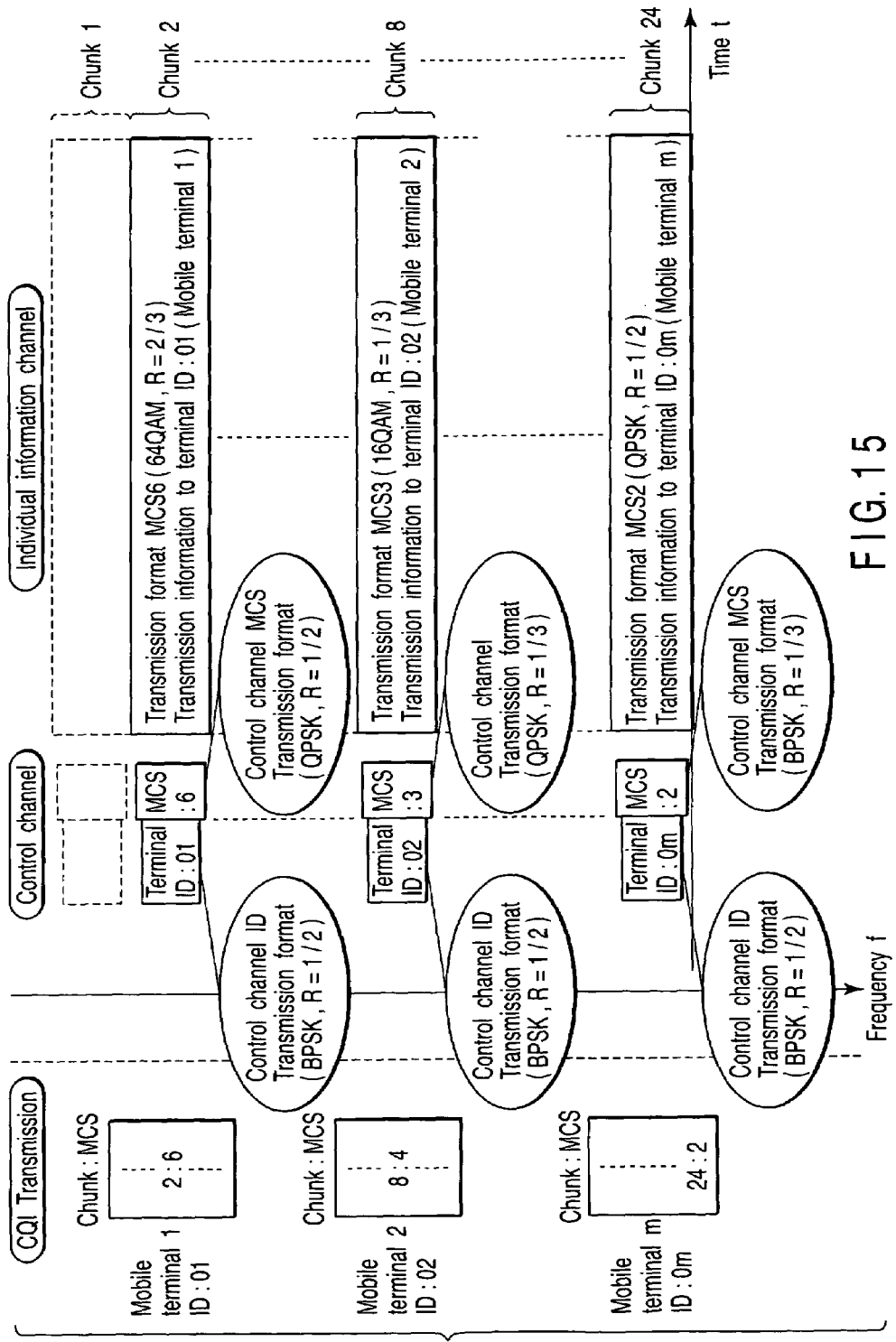
FIG. 15 is an illustration for explanation of the control channel and the individual information channel of information transmitted from the base station to the mobile terminal, in the radio communications system according to the present invention.

As shown in FIG. 15, for example, the terminal ID may be transmitted in the transmission format predetermined by both the mobile terminal and the base station as described in the first embodiment, and the MCS number may be transmitted in the transmission format based on the CQI output from the mobile terminal as described in the second embodiment.

Furthermore, each of the formats of transmitting the terminal ID and the MCS number may be determined on the basis of the CQI output from the mobile terminal, as described in the second embodiment.

In this configuration, the mobile terminal receives all the control channel ID on the basis of the predetermined transmission format. If the mobile terminal cannot detect the terminal ID transmitted for the own mobile terminal, the mobile terminal can stop the receiving operation and the power consumption can be lowered.

Even if the transmission formats on the control channel are different, the frequency band of the control channel is still within the frequency band of the individual information channel whose use is determined on the control channel, and the transmission format of the control channel is still determined on the basis of the transmission format (MCS) of the individual information channel of the band corresponding to the CQI transmitted in advance from the mobile terminal to the base station. Therefore, the same advantage can be obtained.

Furthermore, the base station transmits the first control channel in a predetermined narrow band, and the mobile terminal receives the narrow band and determines the necessity of reception of the individual information channel. If the mobile terminal receives the first control channel transmitted to the own mobile terminal, the mobile terminal receives the second control channel based on the first control channel to acquire the transmission format of the individual information channel. Since the mobile terminal can determine the necessity of reception of the individual information channel on the basis of the reception of the narrow-band first control channel, low power consumption can be implemented. In addition, since the chunk of the individual information channel is represented in the receiving band of the second control channel, the same advantage can be obtained.

More specifically, as shown in FIG. 16, for example, the base station transmits the control channel. In this case, the propagation characteristic of the terminal ID included in the control channel is substantially the same. Thus, the merit of reduction of the possibility of receiving the control channel and not receiving the individual information channel, may be lost. However, the other merits remain unchanged. The merit concerning the control channel MCS also remains unchanged.

In the example shown in FIG. 16, the transmission format of the second control channel is made variable on the basis of the CQI output from the mobile terminal, as described in the second embodiment. However, the second control channel may be transmitted in a preset transmission format as described in the first embodiment.

It is needless to say that the present invention can also be variously modified within a scope which does not depart from the gist of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communications system, which conducts radio communications between a base station and a mobile station, wherein at least the radio communications from the base station to the mobile station are conducted in a multi-carrier scheme in which a signal includes a plurality of sub-carrier groups, and wherein the base station comprises:

first transmission means for transmitting, over a control channel, identification information to identify the mobile station, and format information representing a transmission format of an individual information channel, in association with each other; and second transmission means for transmitting, through a sub-carrier group occupying a frequency band including a frequency in which the control channel is transmitted, the individual information channel for the mobile station identified by the identification information, in the transmission format represented by the format information transmitted over the control channel by the first transmission means; and wherein the mobile station comprises: first reception means for receiving the identification information and the format information over the control channel; and second reception means for receiving the individual information channel through the sub-carrier group occupying the frequency band including the frequency in which the control channel is received, in the transmission format represented by the format information received together with the identification information by the first reception means, if the identification information received by the first reception means identifies the mobile station;

wherein the mobile station further comprises: measurement means for measuring a transmission path quality in accordance with a signal received from the base station; and third transmission means for transmitting format information representing a transmission format determined in accordance with the measurement means; wherein the base station further comprises third reception means for receiving the format information transmitted from the third transmission means; and wherein the first transmission means transmits the identification information to identify the mobile station, and the format information representing the transmission format of the individual information channel, in association with each other, over the control channel, in a transmission format based on the format information received by the third reception means.

2. The radio communications system according to claim 1, wherein the base station further comprises determination means for determining, in accordance with the format information received by the third reception means, a transmission format having a greater transmission efficiency than the transmission format represented by the format information received by the third reception means, as the transmission format of the individual information channel; wherein the first transmission means transmits the identification information to identify the mobile station, and the format information representing the transmission format of the individual information channel determined by the determination means, in association with each other, over the control channel, in the transmission format based on the format information received by the third reception means; and wherein the first reception means receives the identification information and the format information, over the control channel, in the transmission format based on the format information transmitted by the third transmission means.

3. The radio communications system according to claim 1, wherein the base station further comprises determination means for determining, in accordance with the format information received by the third reception means, a transmission format having a greater transmission efficiency than the transmission format represented by the format information received by the third reception means, as the transmission format of the individual information channel; wherein the first transmission means transmits the identification information to identify the mobile station, in a preset transmission format, over the control channel, and transmits the format information representing the transmission format of the individual information channel determined by the determination means, over the control channel, in the transmission format based on the format information received by the third reception means; and wherein the first reception means receives, over the control channel, the identification information to identify the mobile station, in the preset transmission format, and the format information, in the transmission format based on the format information transmitted by the third transmission means.

4. The radio communications system according to claim 1, wherein the first transmission means transmits the identification information to identify the mobile station, in a preset transmission format, over a first control channel in a first frequency band, and transmits the format information representing the transmission format of the individual information channel, over a second control channel having a second frequency band corresponding to and broader than the first frequency band;

wherein the second transmission means transmits the individual information channel through a sub-carrier group occupying a frequency band including the second frequency band in which the second control channel is transmitted, for the mobile station identified by the identification information, in the transmission format represented by the format information transmitted over the second control channel by the first transmission means;

wherein the first reception means acquires the format information representing the transmission format of the individual information channel by receiving the identification information over the first control channel, in the preset transmission format, and by receiving the second control channel, in a band based on a frequency band receiving the first control channel; and wherein the second reception means receives the individual information channel through the sub-carrier group occupying the frequency band including the second frequency band in which the second control channel is received, in the transmission format represented by the format information received together with the identification information by the first reception means, if the identification information received by the first reception means identifies the mobile station.

5. A base station apparatus of a radio communications system, which conducts multi-carrier radio communications, in which a signal includes a plurality of sub-carrier groups, with a mobile station, the base station apparatus comprising:

first transmission means for transmitting, over a control channel, identification information to identify the mobile station, and format information representing a transmission format of an individual information channel, in association with each other; and second transmission means for transmitting, through a sub-carrier group occupying a frequency band including a frequency in which the control channel is transmitted, the individual information channel for the mobile station identified by the identification information, in the transmission format represented by the format information transmitted over the control channel by the first transmission means;

wherein the mobile station further comprises: measurement means for measuring a transmission path quality in accordance with a signal received from the base station; and third transmission means for transmitting format information representing a transmission format determined in accordance with the measurement means;

wherein the base station further comprises third reception means for receiving the format information transmitted from the third transmission means; and wherein the first transmission means transmits the identification information to identify the mobile station, and the format information representing the transmission format of the individual information channel, in association with each other, over the control channel, in a transmission format based on the format information received by the third reception means.

6. A mobile radio terminal apparatus, for receiving a multi-carrier radio signal, which includes a plurality of sub-carrier groups, from a base station, the mobile radio terminal apparatus comprising:

first reception means for receiving, from the base station over a control channel, identification information identifying the mobile station and format information representing a transmission format of an individual information channel; and second reception means for receiving the individual information channel, through a sub-carrier group occupying a frequency band including a frequency in which the control channel is received, in the transmission format represented by the format information received together with the identification information by the first reception means, if the identification information received by the first reception means identifies the mobile station;

wherein the mobile station further comprises: measurement means for measuring a transmission path quality in accordance with a signal received from the base station; and third transmission means for transmitting format information representing a transmission format determined in accordance with the measurement means; wherein the base station further comprises third reception means for receiving the format information transmitted from the third transmission means; and wherein the first transmission means transmits the identification information to identify the mobile station, and the format information representing the transmission format of the individual information channel, in association with each other, over the control channel, in a transmission format based on the format information received by the third reception means.

* * * * *